United States Patent
Ding et al.

(10) Patent No.: US 10,852,889 B2
(45) Date of Patent: Dec. 1, 2020

(54) DISPLAY PANEL, MOBILE TERMINAL AND DRIVING METHOD

(71) Applicant: Shanghai Tianma Micro-Electronics Co., Ltd., Shanghai (CN)

(72) Inventors: Hong Ding, Shanghai (CN); Lingxiao Du, Shanghai (CN); Huiping Chai, Shanghai (CN); Kang Yang, Shanghai (CN); Liang Xie, Shanghai (CN); Qing Zhang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 87 days.

(21) Appl. No.: 15/876,345

(22) Filed: Jan. 22, 2018

(65) Prior Publication Data

US 2019/0042019 A1 Feb. 7, 2019

(30) Foreign Application Priority Data

Aug. 1, 2017 (CN) .......................... 2017 1 0646765

(51) Int. Cl.
*G06F 3/044* (2006.01)
*G09G 3/36* (2006.01)
(Continued)

(52) U.S. Cl.
CPC .............. *G06F 3/044* (2013.01); *G06F 3/047* (2013.01); *G09G 3/2092* (2013.01);
(Continued)

(58) Field of Classification Search
CPC ...................... G06F 3/044; G06F 3/047; G06F 2203/04112; G09G 3/2092; G09G 3/3208; G09G 3/36; G09G 2310/0264
See application file for complete search history.

(56) References Cited

U.S. PATENT DOCUMENTS

2010/0171718 A1* 7/2010 Denda ..................... G06F 3/044
                                                    345/173
2013/0271426 A1* 10/2013 Yumoto ................. G06F 3/041
                                                    345/174
(Continued)

FOREIGN PATENT DOCUMENTS

CN          205899517 U        1/2017
CN          106796468 A        5/2017

OTHER PUBLICATIONS

Chinese Office Action dated Sep. 18, 2019 for corresponding Chinese Application No. 201710646765.6.

(Continued)

*Primary Examiner* — Stephen G Sherman
(74) *Attorney, Agent, or Firm* — Tarolli, Sundheim, Covell & Tummino LLP

(57) ABSTRACT

Provided are display panel, mobile terminal and a driving method for reducing the width of the border and increasing the touch sensitivity of the special-shaped area. The display panel is divided into a display area and a non-display area, the display area includes a first area and a second area, the first area is a convex area extending from a side of the second area and protruding away from the side of the second area; the display panel includes first touch electrodes placed in the first area and second touch electrodes placed in the second area, the first touch electrode is one of an self-capacitance touch electrode and an mutual capacitive touch electrode while the second touch electrode is the other one of the self-capacitance touch electrode and the mutual capacitive touch electrode. The display panel above is suitable for the mobile terminal.

18 Claims, 14 Drawing Sheets

(51) Int. Cl.
    *G06F 3/047*          (2006.01)
    *G09G 3/3208*        (2016.01)
    *G09G 3/20*           (2006.01)

(52) U.S. Cl.
    CPC ............. *G09G 3/3208* (2013.01); *G09G 3/36* (2013.01); *G06F 2203/04112* (2013.01); *G09G 2310/0264* (2013.01)

(56) References Cited

U.S. PATENT DOCUMENTS

| | | | | |
|---|---|---|---|---|
| 2015/0324056 | A1* | 11/2015 | Sato | G06F 3/0416 345/174 |
| 2016/0266675 | A1* | 9/2016 | Yang | G06F 3/0412 |
| 2017/0123452 | A1* | 5/2017 | Evans, V | G02F 1/133305 |
| 2017/0308200 | A1* | 10/2017 | Mugiraneza | G06F 3/044 |
| 2019/0004626 | A1* | 1/2019 | Ko | G06F 3/044 |

OTHER PUBLICATIONS

Chinese OA dated Mar. 5, 2020 for corresponding Chinese application No. 201710646765.6.

* cited by examiner

DISPLAY PANEL, MOBILE TERMINAL AND DRIVING METHOD

CROSS-REFERENCE TO RELATED APPLICATIONS

The present application claims priority to Chinese Patent Application No. 201710646765.6, filed on Aug. 1, 2017, the content of which is incorporated herein by reference in its entirety.

TECHNICAL FIELD

The present disclosure relates to the field of display techniques and, particularly, relates to a display panel, a mobile terminal, and a driving method.

BACKGROUND

With the development of touch technologies, more and more touch devices appear on the market. At present, among various touch technologies, the capacitive touch technology because of its high sensing accuracy, high transmittance, fast response speed, long service life and other advantages, has gradually become the mainstream products in the market.

In the touch devices, receiver, control key, and camera are all shaped in irregular quadrangle, therefore, both side areas of the receiver, control key or the camera are called as special-shaped area. The special-shaped area is not suitable to accommodate a touch electrode, and as for this, there are two solutions in the conventional art. As a first solution, the special-shaped area is used as a non-display area without any touch electrode placed, however, such design increases a width of a border of the display device, contrary to a popular trend; as a second solution, the special-shaped area is used as a display area, however, due to a bigger size of the mutual capacitance touch electrode, a part of the mutual capacitance touch electrode at the edge of the special-shaped area must be cut off such that the mutual capacitance touch electrode could be placed in the special-shaped area, resulting in a poor touch sensitivity of the edge position of the special-shaped area.

SUMMARY

The present application provides a display panel, a mobile terminal, and a driving method, for reducing the width of the border and increasing the touch sensitivity of the special-shaped area.

A first aspect of the present disclosure provides a display panel divided into a display area and a non-display area, wherein the display area includes a first area and a second area, the first area being a convex area extending from a side of the second area and protruding away from the side of the second area; wherein the display panel includes: a plurality of first touch electrodes placed in the first area and a plurality of second touch electrodes placed in the second area, wherein each of the plurality of first touch electrodes is a self-capacitance touch electrode, and each of the plurality of second touch electrodes is a mutual capacitance touch electrode.

A second aspect of the present disclosure provides a mobile terminal including the display panel as described in the first aspect.

A third aspect of the present disclosure provides a driving method applicable for the mobile terminal. The driving method, in a touch method, includes: providing a driving electric signal to each of a plurality of self-capacitance touch electrodes and providing a driving electric signal to each of a plurality of mutual capacitance touch electrodes simultaneously, acquiring a sense electric signal of each of the plurality of self-capacitance touch electrodes, and acquiring another sense electric signal of each of the plurality of mutual capacitance touch electrodes, wherein the mobile terminal includes a display panel divided into a display area and a non-display area, wherein the display area includes a first area and a second area, the first area being a convex area extending from a side of the second area and protruding away from the side of the second area; wherein the plurality of self-capacitance touch electrodes and the plurality of mutual capacitance touch electrodes are parts of the display panel; and wherein the plurality of self-capacitance touch electrodes is placed in the first area, and the plurality of mutual capacitance touch electrodes is placed in the second area.

BRIEF DESCRIPTION OF DRAWINGS

In order to more clearly illustrate the technical solutions of the embodiments of the present disclosure or the conventional art, the accompanying drawings necessary for describing the embodiments of the present disclosure or the conventional art are simply introduced as below. The following drawings are merely a part of embodiments of the present disclosure, and those skilled in the art can still obtain other drawings based on these drawings without paying any creative work.

DESCRIPTION OF EMBODIMENTS

In order to make the purposes, the technical solutions, and advantages of embodiments of the disclosure more clear, the technical solutions of the embodiments of the disclosure will be clearly and fully described with reference to the accompanying drawings. The described embodiments of the disclosure are merely a part of embodiments but not all the embodiments. Based on those embodiments in the present disclosure, all other embodiments obtained by those killed in the art without paying any creative work shall fall into the protection scope of the present disclosure.

Terms used in the embodiments of the present disclosure are merely used to describe the specific embodiments, rather than to limit the present disclosure. The expressions "a", "an" and "the" in a singular form used in the embodiments and the attached claims of the present disclosure shall include plural forms thereof, unless otherwise noted.

It should be understood that the term "and/or" is merely used to describe a correlation of the related objects, which may represent three types of relations, for example, only A, both A and B, or only B. Besides, the symbol "/" generally represents an "or" relation between the related object.

It should be understood that, even an electrode or a lead wire may be defined by terms such as "first", "second" and the like in the embodiments of the present disclosure, the electrode or lead wire is not limited by those terms. Those terms are merely used to distinguish the electrodes or lead wires. For example, within the scope of the embodiments of the present disclosure, a first touch sub-electrode can also be referred to be as a second touch sub-electrode, a second touch sub-electrode can also be referred to be as a first touch sub-electrode, and similarly, a second lead wire can also be referred to be as a first lead wire.

Figure 1:
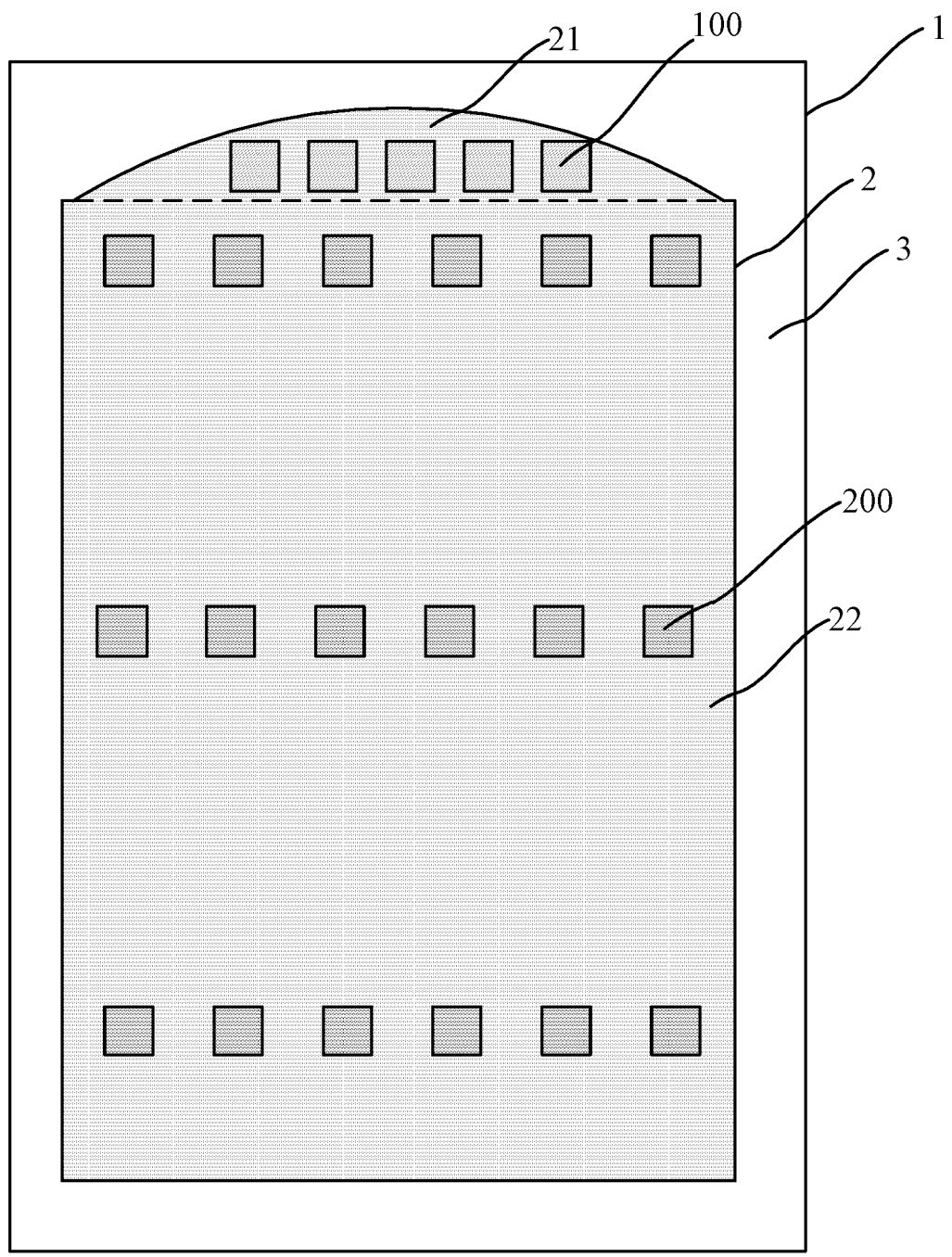
FIG. 1 is a first structural schematic diagram of a display panel according to an embodiment of the present disclosure.
Figure 2:
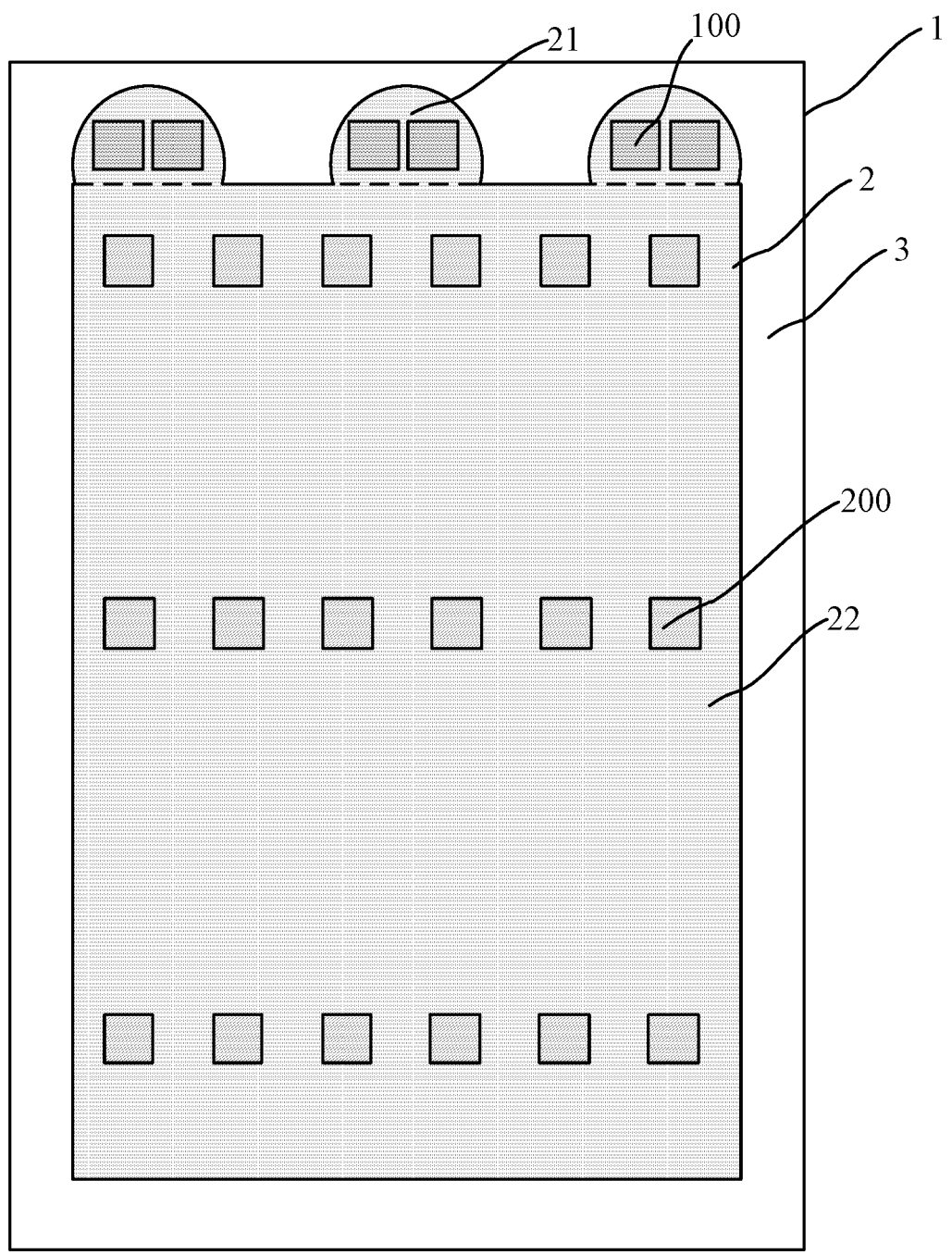
FIG. 2 is a second schematic structural schematic diagram of the display panel according to an embodiment of the present disclosure.

The embodiments of the present disclosure provide a display panel. FIG. 1 is a first structural schematic diagram of a display panel according to an embodiment of the present disclosure, and FIG. 2 is a second schematic structural schematic diagram of the display panel according to an embodiment of the present disclosure. As shown in FIGS. 1 and 2, the display panel 1 is divided into a display area 2 and a non-display area 3, the display area 2 includes a first area 21 and a second area 22, and the first area 21 is a convex area protruding outwardly from a side of the second area 22 along a direction away from the side of the second area 22. The display panel 1 includes a plurality of first touch electrodes 100 and a plurality of second touch electrodes 200, the plurality of first touch electrodes 100 is placed in the first area 21, and the plurality of second touch electrodes 200 is placed in the second area 22. The first touch electrodes 100 are self-capacitance touch electrodes, and the second touch electrodes 200 are mutual capacitance touch electrodes.

Figure 3:
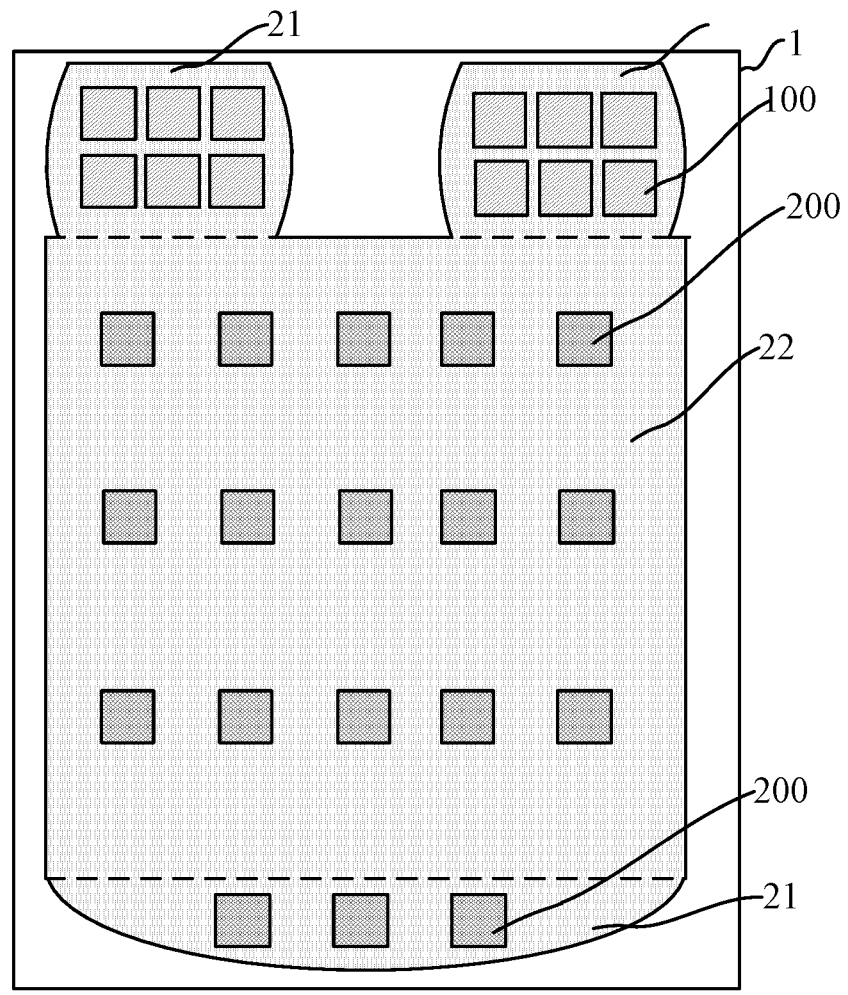
FIG. 3 is a third structural schematic diagram of the display panel according to an embodiment of the present disclosure.

It is understood that, as shown in FIG. 3, which is a third structural schematic diagram of the display panel according to an embodiment of the present disclosure, the shape of the convex area of the present embodiment may be not limited to those shown in FIGS. 1 and 2, and the convex area (i.e., the first area) 21 is arranged at an upper side of the second area 22 (based on the orientation shown in FIG. 2). Alternatively, as shown in FIG. 3, the convex area (i.e., the first area) 21 can also be arranged at both the upper side and the lower side of the second area 22 (based on the orientation shown in FIG. 3). Further with reference to FIG. 3, two first areas 21 are placed at the upper side of the second area 22, one first area 21 is placed at the lower side of the second area 22, and each of the two first areas at the upper side of the second area 22 is provided with a plurality of first touch electrodes 100, and the first area 21 placed at the lower side of the second area 22 is provided with a plurality of second touch electrode 200. In fact, the number of the first area is not specifically limited in the present embodiment. Moreover, the first area 21 can be provided with both the first touch electrode and the second touch electrode. Preferably, in the present embodiment, each of the first areas is provided with only the first touch electrodes.

It should be noted that the non-display area 3 is the rest area of the display panel except the display area 2. For example, FIGS. 1-3 show a plurality of first touch electrodes and a plurality of second touch electrodes, and in fact, the number of the first touch electrode and the number of the second touch electrode are not specially limited in the present embodiment, and the arrangement manner of the second touch electrode in the second area is also not specially limited. In addition, positions and sizes of the first touch electrodes and the second touch electrodes of the present embodiment shown in the figures do not represent the positions and sizes of the first touch electrodes and the second touch electrodes in an actual production process, similarly, the areas occupied by the first area and the second area is not specially limited in the present embodiment, which can be determined according to a size of a related touch device or mobile terminal.

It can be understood that the first area is a convex area extending from a side of the second area and protruding along a direction away from the side of the second area, and the first area is called a special-shaped area in the present embodiment.

In the conventional art, the first area (i.e., the special-shaped area) serves as the non-display area, which increases a width of a border of the display panel, contrary to the popular trend. Compared with the conventional art, on the one hand, the first area is used as the display area in the present embodiment, so that, for a touch devices with the same size, the area occupied by the display area is increased and the area occupied by the non-display area is reduced, thereby narrowing the width of the border and satisfying a need of the users for a narrow border; and on the other hand, the first area is a touch area, which increases an effective utilization area of the touch area.

In addition, even if the special-shaped area is used as the display area, after the mutual capacitance touch electrode including a driving electrode and a sensing electrode opposite to the driving electrode is placed in the special-shaped area, there will be many limitations on the size and shape. When the area of the special-shaped area is relatively small, the mutual capacitance touch electrode panel must be cut in order to be accommodated in the special-shaped area, resulting in a weak touch induction and poor touch sensitivity. Further, the mutual capacitance touch electrode is driven in a manner that the mutual capacitance touch electrodes in a same row/column are driven simultaneously; therefore, it's necessary to connect the mutual capacitance touch electrodes in in a same row/column together. If the display panel has a plurality of first areas and each first area is provided with at least one mutual capacitance touch electrode, it will be almost impossible to span across the plurality of first areas to connect the mutual capacitance touch electrodes in the same row/column. Even if the mutual capacitance touch electrodes in the same row/column can be connected together, the wiring manner will be complicated. However, in the present embodiment, the self-capacitance touch electrode is used as the first touch electrode arranged in the first area and each self-capacitance touch electrode is connected to the IC driving end by a separate touch line, so that there will be no need to connect the self-capacitance touch electrodes in the first area. Therefore, the wiring manner of the self-capacitance touch electrodes is simple and suitable for special-shaped areas in various shapes.

It is understandable that, in the present embodiment, the self-capacitance touch electrodes can be independent block-shaped electrodes arranged in an array, and the block-shaped self-capacitance touch electrodes are independent from each other, such that mutual interference will be less and a making process is simple. When the self-capacitance touch electrodes is arranged in the first area, a size of the self-capacitance touch electrode can be designed according to an area of the first area, therefore, the self-capacitance touch electrode placed in the first area does not need to be cut and the touch sensitivity will be higher. In addition, on one hand, the mutual capacitance touch electrode includes the driving electrode and the sensing electrode opposite to the driving electrode, and mutual limitations exist between the driving electrode and the sensing electrode, while the self-capacitance touch electrode is related only to its own area and has less restriction, therefore, the self-capacitance touch electrode has relatively higher freedom degree than the mutual capacitance touch electrode. On the other hand, since the mutual capacitance touch electrode is restricted by the driving electrode and the sensing electrode, it cannot be made in a special shape, however, the self-capacitance touch electrode can be made in various shapes according to its own condition.

When the second area is provided with a plurality of self-capacitance touch electrodes, since the self-capacitance touch electrode requires a large number of wirings, and the large number of wirings will occupy a relatively large number of IC driving ends, which adversely affects a response time of the touch device. However, in the present embodiment, the mutual capacitive touch electrode is used as the second touch electrode arranged in the second area, which effectively reduces the number of the wirings and reduces the number of IC driving ends occupied.

In an implementation of the present embodiment, as shown in FIG. 2, the shape of the second area 22 could be rectangular. It is understandable that, the second area occupies a larger proportion of the area of the display area, therefore, when the second area is rectangular in shape, it is convenient to cut the whole panel into the display panel with a fixed size, and the making process is relatively simple.

Figure 4:
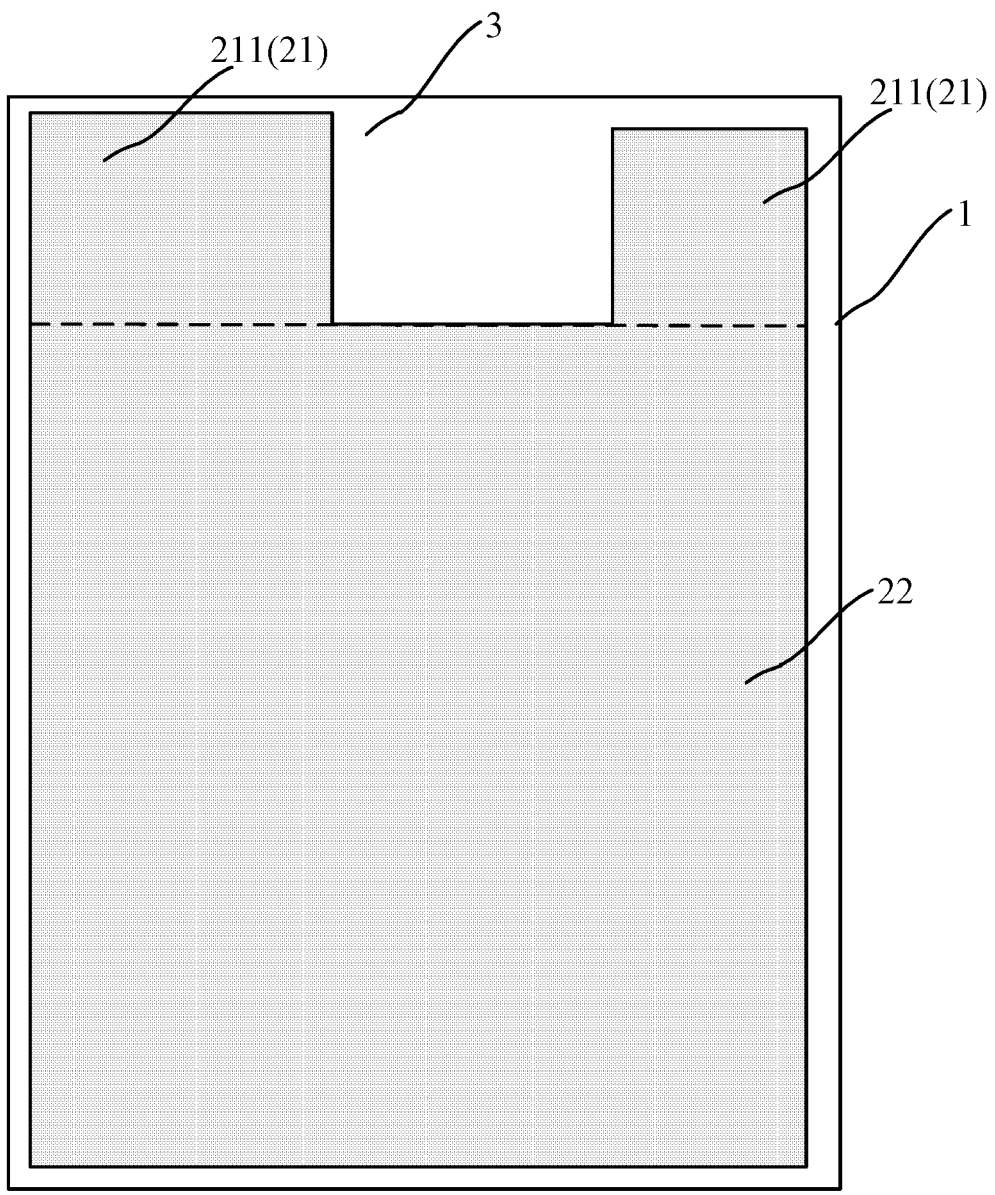
FIG. 4 is a fourth structural schematic diagram of the display panel according to an embodiment of the present disclosure.

In another feasible implementation of the present embodiment, as shown in FIG. 4, which is a fourth structural schematic diagram of the display panel according to an embodiment of the present disclosure, the first area 21 includes at least two subareas 211, and the at least two subareas 211 are placed at a same side of the second area 22 and are spaced from one another, for example, spaced by the non-display area 3 or a hollow area.

If the mutual capacitive touch electrodes are placed in the subareas, it will be difficult to connect the mutual capacitive touch electrodes located in a same row but in different subareas. Furthermore, even if they are connected together, the wiring manner will be complicated. In the present embodiment, the touch electrodes placed in the two subareas are self-capacitance touch electrodes, the self-capacitance touch electrodes are independently bock-shaped, and each block-shaped self-capacitance touch electrode is separately wired, that is, each self-capacitance touch electrode is connected to a corresponding driving end by a separate touch line, such that the wiring manner is simple and is easily realized.

Figure 5:
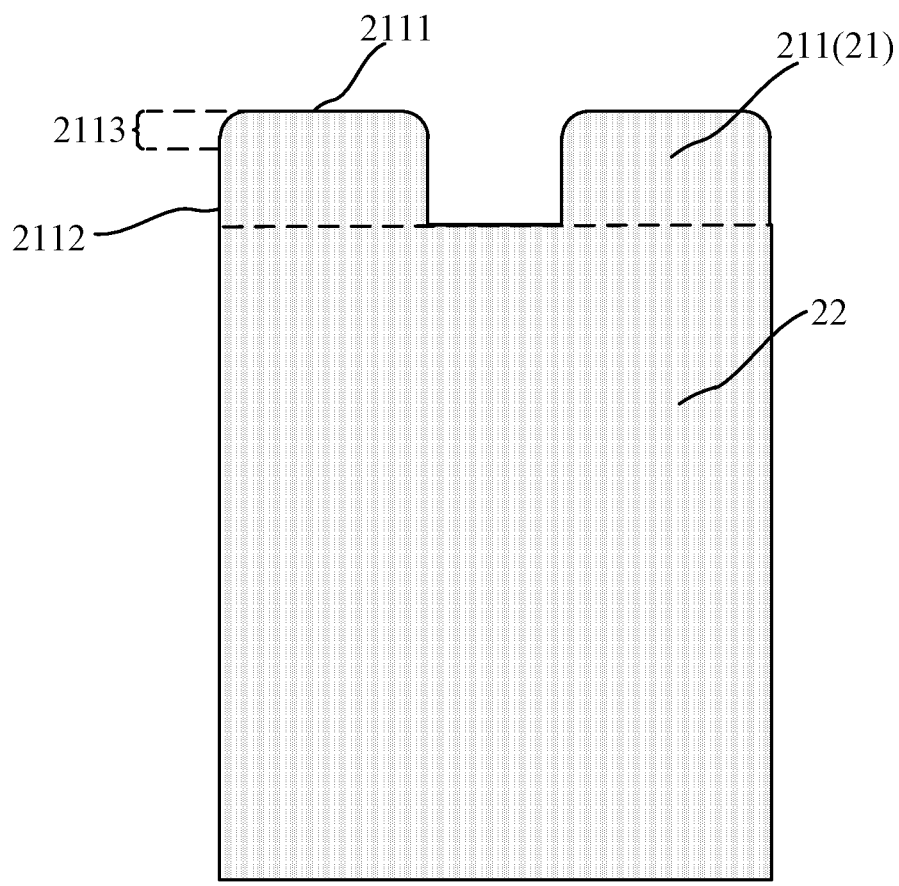
FIG. 5 is a first schematic diagram of a shape of a first area according to an embodiment of the present disclosure.

Further, one of the two subareas can have a same shape and area as the other one of the two subareas (as shown in FIG. 4), or one of the two subareas can have a different shape and area from the other one of the two subareas (as shown in FIG. 5). Preferably, in the present embodiment, as shown in FIG. 5, which is a first schematic diagram of a shape of the first area, the shape and area of the two subareas in the present embodiment are identical, such that the two subareas will be easily made with a low cost.

It should be noted that, the non-display area 3 between the two subareas can be provided with a wiring of the first touch electrode and a wiring of the second touch electrode, and also a camera, a receiver, and a speaker, etc.

Still further, as shown in FIG. 4, the subarea 211 is rectangular in shape. It is convenient to cut the rectangular subarea into a specified size, and the operation is simple, thereby improving the cutting efficiency.

As shown in FIG. 5, the subarea 211 includes a first edge 2111, a second edge 2112, and a connection edge 2113, and the subarea first edge 2111 is connected to the subarea second edge 2112 by the connection edge 2113. An extending direction of the first edge 2111 is perpendicular or substantially perpendicular to an extending direction of the second edge 2112.

Figure 6:
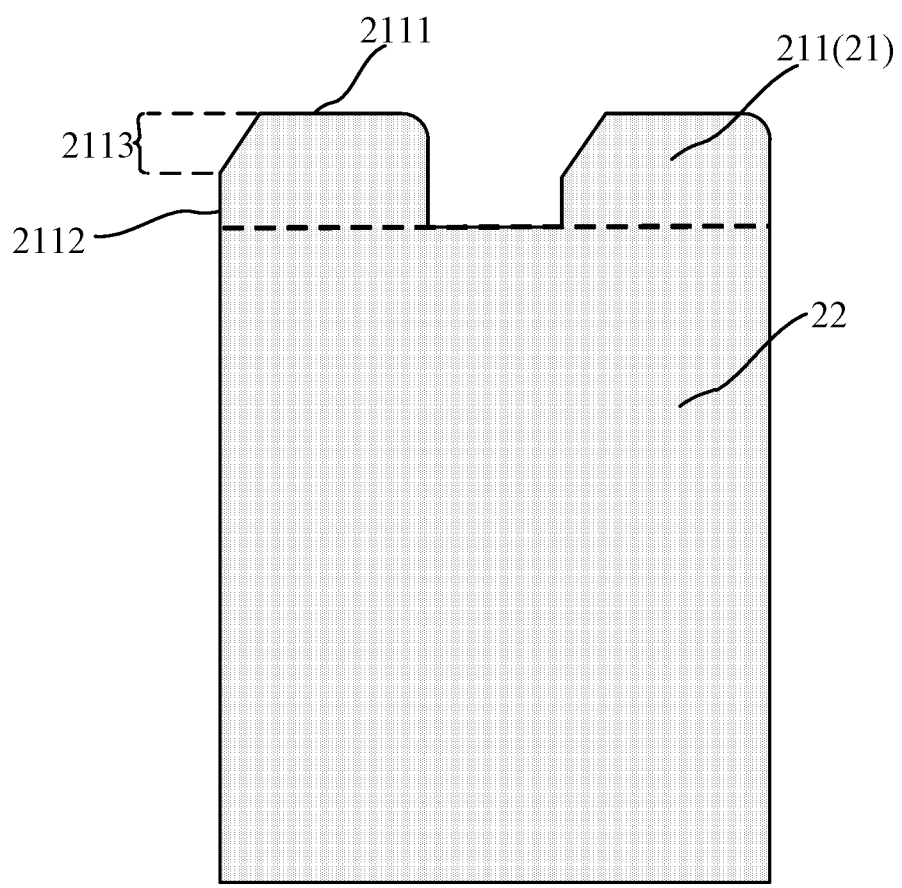
FIG. 6 is a second schematic diagram of the shape of the first area according to an embodiment of the present disclosure.

Further, as shown in FIG. 5, the connection edge 2113 can be an arc line. It will be difficult to fix the packaging glue there during packaging if the connection edge 2113 has a sharp angle, which adversely affects the packaging effect. The connection edge in the present embodiment is an arc line, which is good for packaging. Alternatively, as shown in FIG. 6, which is a second schematic diagram of the shape of the first area according to an embodiment of the present disclosure, the connection edge 2113 can be a straight line. When the connection edge is a straight line, a triangular area will be formed there, such that pressing keys or other exposed device can arranged in such triangular area, and thus neither the normal touch nor the wiring of the device there will be adversely affected, thereby enhancing the practicality. Alternatively, as shown in FIG. 7, which is a third schematic diagram of the shape of the first area according to an embodiment of the present disclosure, the connection edge 2113 is polygonal line forming a convex pattern extending from a side of the second area and protruding away from the side of the second area, which allows the device (camera or receiver) to be stuck in a recess formed by two opposite convex patterns, such that the device will be installed more reliably.

It should be interpreted that the extending direction of the first edge of the subarea can be a long edge direction of the display panel and the extending direction of the second edge of the subarea can be a short edge direction of the display panel, or the extending direction of the first edge of the subarea can be the short edge direction of the display panel and the extending direction of the second edge of the subarea can be the long edge direction of the display panel, which are not specially limited in the present embodiment. For example, in FIGS. 5-7, the extending direction of the first edge of the subarea is the short edge direction of the display panel, and the extending direction of the second edge of the subarea is the long edge direction of the display panel.

Figure 7:
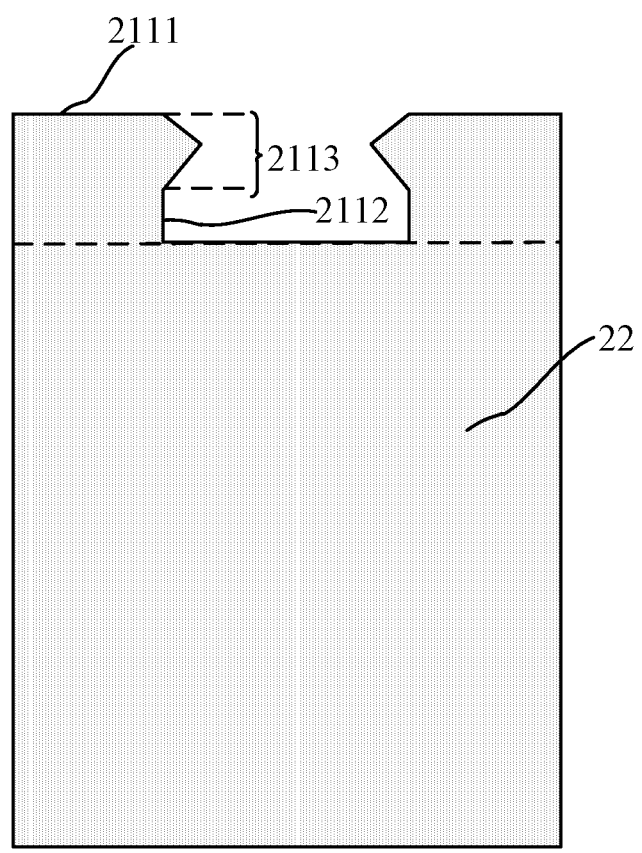
FIG. 7 is a third schematic diagram of the shape of the first area according to an embodiment of the present disclosure.

In addition, as an example, as shown in FIGS. 5-7, when the extending direction of the first edge of the subarea is set to be the short edge direction of the display panel, based on an orientation shown in figures, a left edge of the subarea is the second edge of the subarea, and the rest edge of the subarea except the first edge and the second edge can be called a third edge of the subarea, at this time, the third edge can be connected with the first edge by the connection edge and the connection edge can be shaped in the abovementioned arch line or straight line, or an included angle between the third edge and the first edge is 90 degree or approximately 90 degree. In the present embodiment, the connection relation between the first edge of the subarea and the second edge of the subarea is not specifically limited.

Figure 8:
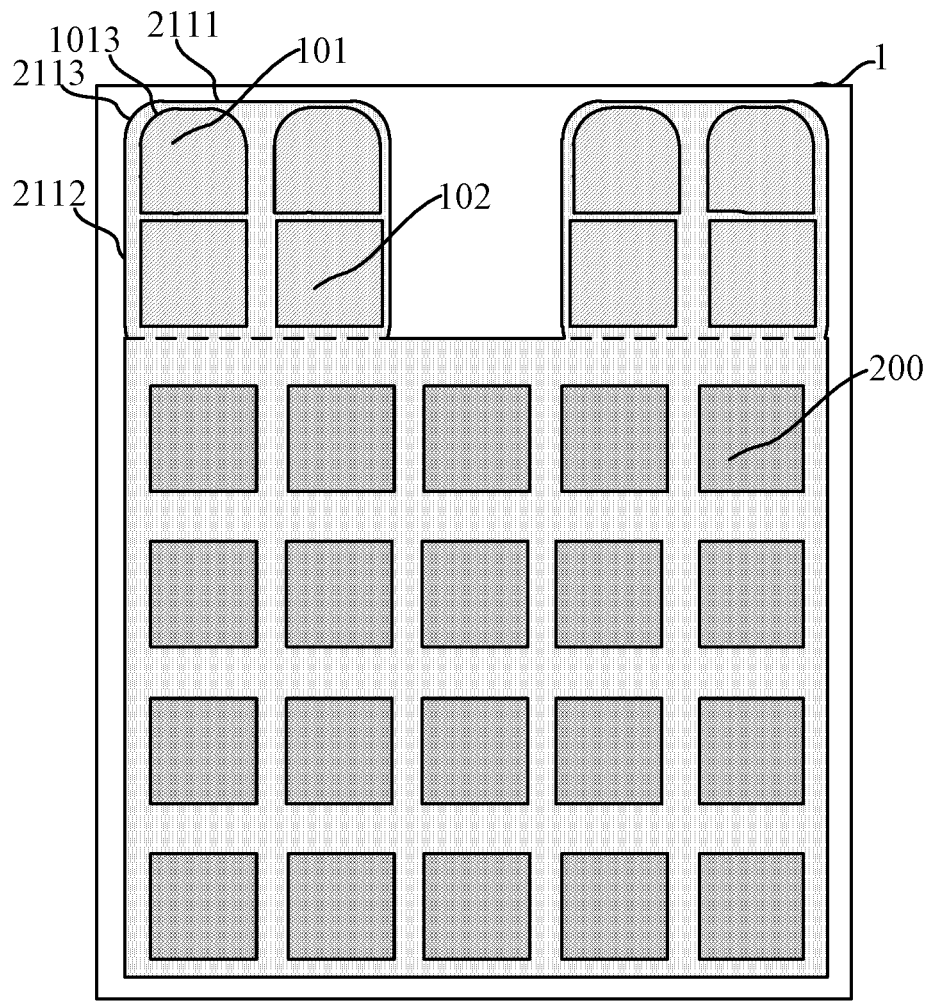
FIG. 8 is a fifth structural schematic diagram of the display panel according to an embodiment of the present disclosure.

Combining the above technical solutions, according to an embodiment, as shown in FIG. 8, which is a fifth structural schematic diagram of the display panel, the first touch electrode 100 includes a first touch sub-electrode 101 and a second touch sub-electrode 102, and at least one first touch sub-electrode 101 and at least one second touch sub-electrode 102 are placed in each subarea 211. The at least one first touch sub-electrode 101 includes one first touch sub-electrode 101 adjacent to the connection edge 2113, and the first touch sub-electrode 101 adjacent to the connection edge 2113 includes an edge 1013 with the same shape as the connection edge 2113. Or, as shown in FIG. 9, which is a sixth structural schematic diagram of the display panel according to an embodiment of the present disclosure, at least two first touch sub-electrodes 101 are adjacent to the connection edge 2113, and the at least two first touch sub-electrodes 101 have at least two edges adjacent to the connection edge 2113, and the at least two edges adjacent to the connection edge when spliced together have the same shape as the connection edge 2113.

It is understandable that the first touch sub-electrode can be a self-capacitance touch electrode. When there is a need to make a touch electrode with an edge identical to the connection edge of the special-shaped area in shape, it will be simple to make a self-capacitance touch electrode, as the self-capacitance touch electrode has higher freedom degree and more diversity in shape than the mutual capacitance touch electrode, while it is difficult to make a mutual capacitance touch electrode with an edge identical to the connection edge of the special-shaped area in shape. As for specific reasons, please refer to the above description about the freedom degree and shape diversity thereof It should be interpreted that, the shape of the second touch sub-electrode can be the same as the first touch sub-electrode, or be different from the first touch sub-electrode, which is not limited in the present disclosure. Similarly, a shape of the rest edge of the first touch sub-electrode can be identical to or different from an adjacent edge, which is not particularly limited in the present disclosure either. In addition, as shown in FIG. 8 and FIG. 9, an edge of the first touch sub-electrode 101 identical to the connection edge of the first area in shape is located at a position closest to the connection edge. As an example, based on an orientation shown in FIG. 8, the connection edge is located at an upper left corner, and an upper left edge of the first touch sub-electrode is the same as the connection edge in shape. Similarly, when the connection side is located at an upper right corner, an upper right edge of the first touch sub-electrode is the same as the connection edge in shape. That is to say, an edge of the first touch sub-electrode having a same shape as the connection edge is also located at a same position as the connection edge.

Because the first touch sub-electrode includes an edge having a same shape as the connection edge, on the one hand, cutting of the first touch sub-electrode can be avoided and the sensitivity of the touch signal is ensured; on the other hand, there is no large gap between the connection edge and the first touch sub-electrode, so as to improve the touch sensitivity near the connection edge. Similarly, when the edge spliced with at least two first touch sub-electrodes has a same shape as the same as the connection edge, the sensitivity of the touch signal can be ensured and the touch sensitivity near the connection edge can also be improved.

Figure 9:
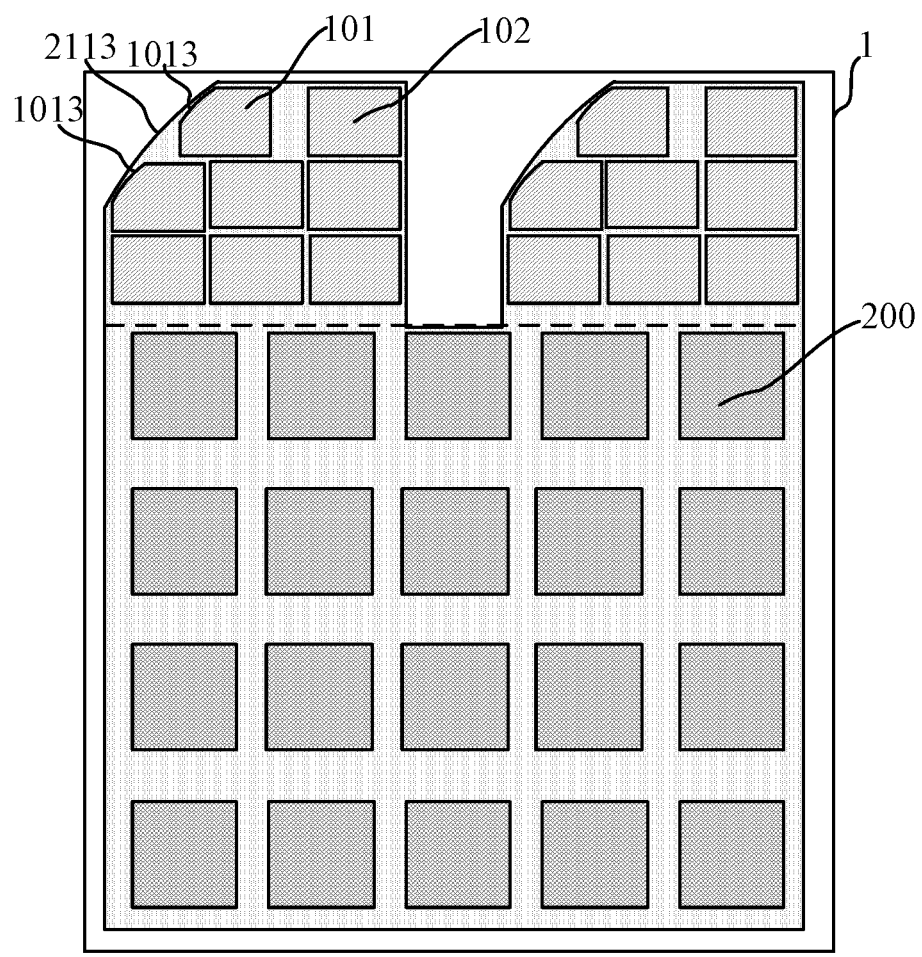
FIG. 9 is a sixth structural schematic diagram of the display panel according to an embodiment of the present disclosure.

In another feasible implementation, as shown in FIGS. 8 and 9, an area ratio of the first touch sub-electrodes 101 to the second touch sub-electrode 102 is x, and $0.9<=x<1$. Since both a touch signal value of the first touch sub-electrode and a touch signal value of the second touch sub-electrode were driven by a same driving end, a touch signal value difference between the first touch sub-electrode and the second touch sub-electrode will be relatively great when an area difference thereof is great, which can result in an incorrect operation. Therefore, it is necessary that the area ratio between the first touch sub-electrode and the second touch sub-electrode is less than 10%, so that the touch signal value of the first touch sub-electrode approaches to the touch signal value of the second touch sub-electrode, and no big difference exists between the two.

Moreover, if the first touch sub-electrode and the second touch sub-electrode are mutual capacitance touch electrodes, due to the various limitations (limited by the driving electrode and the sensing electrode), it is difficult to limit the area ratio of the first touch sub-electrode to the second touch sub-electrode to be no more than 10%, at this time, a relatively great touch difference will exist between the touch signal values of the first touch sub-electrode and the second touch sub-electrode.

In another feasible implementation, the first touch electrode and the second touch electrode are placed in a same layer.

Figure 10:
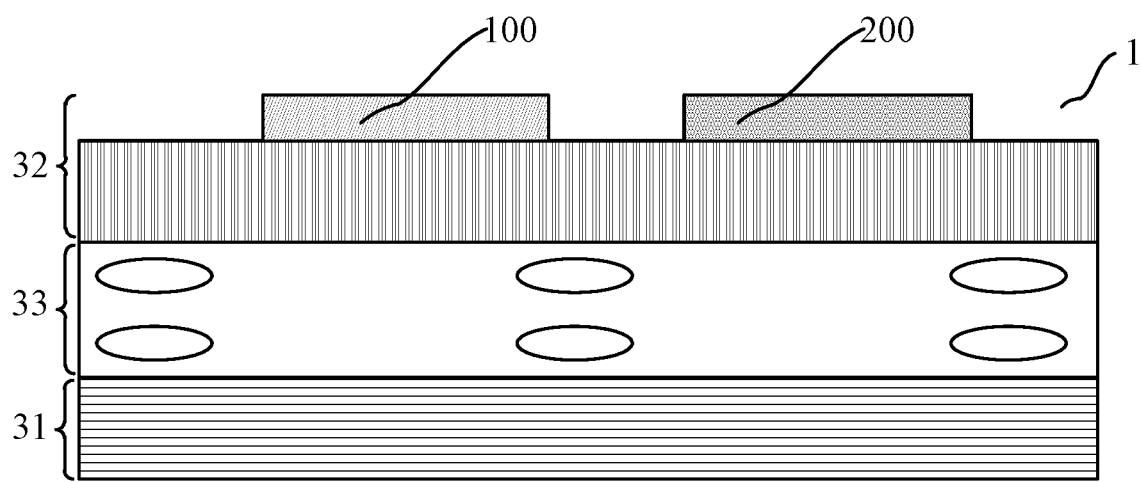
FIG. 10 is a structural schematic diagram of a liquid crystal display panel according to an embodiment of the present disclosure.

Further, as shown in FIG. 10, which is a structural schematic diagram of a liquid crystal display panel according to an embodiment of the present disclosure, the display panel 1 is a liquid crystal display panel 1, and the liquid crystal display panel 1 includes an array substrate 31, a color film substrate 32 corresponding to the array substrate 31, and a liquid crystal layer 33 arranged between the array substrate 31 and the color film substrate 32. Both the first touch electrode 100 and the second touch electrode 200 are arranged on the color film substrate 32. Relatively, the color film substrate is close to an upper edge of the display panel.

When a finger touches the display panel, a distance between the finger and the first and second touch electrodes is relatively small, so that placing the first touch electrode and the second touch electrode on the color film substrate can increase the touch sensitivity of the first touch electrode and the second touch electrode.

Figure 11:
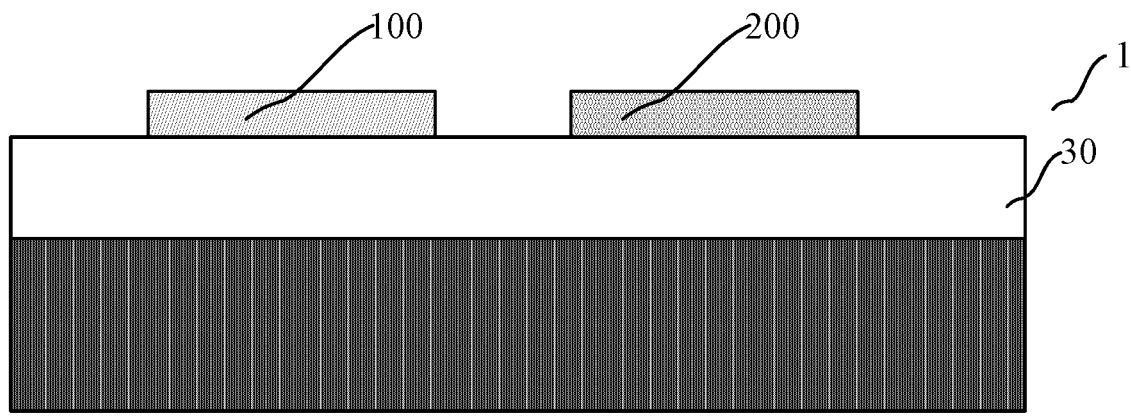
FIG. 11 is a structural schematic diagram of an organic light-emitting display panel according to an embodiment of the present disclosure.

Alternatively, as shown in FIG. 11, which is a structural schematic diagram of an organic light-emitting display panel according to an embodiment of the present disclosure, the display panel 1 is an organic light-emitting display panel 1. It can be understood that the organic light-emitting display panel 1 can include a cover plate 30, and the first touch electrode 100 and the second touch electrode 200 can be placed on the cover plate 30. When a finger touches the display panel, the cover plate is closer to the finger than other structures in the display panel 1, which narrows the distance between the finger and the first and second touch electrodes, so that setting the first touch electrode and second touch electrode on the cover plate can increase the touch sensitivity.

In addition, the display panel in the embodiments can also be a flexible display panel, and the first touch electrode and the second touch electrode can be placed in a packaging layer. Since the packaging layer is located in the outermost layer of the display panel, the touch sensitivity of the first touch electrode and the second touch electrode can be increased.

Figure 12:
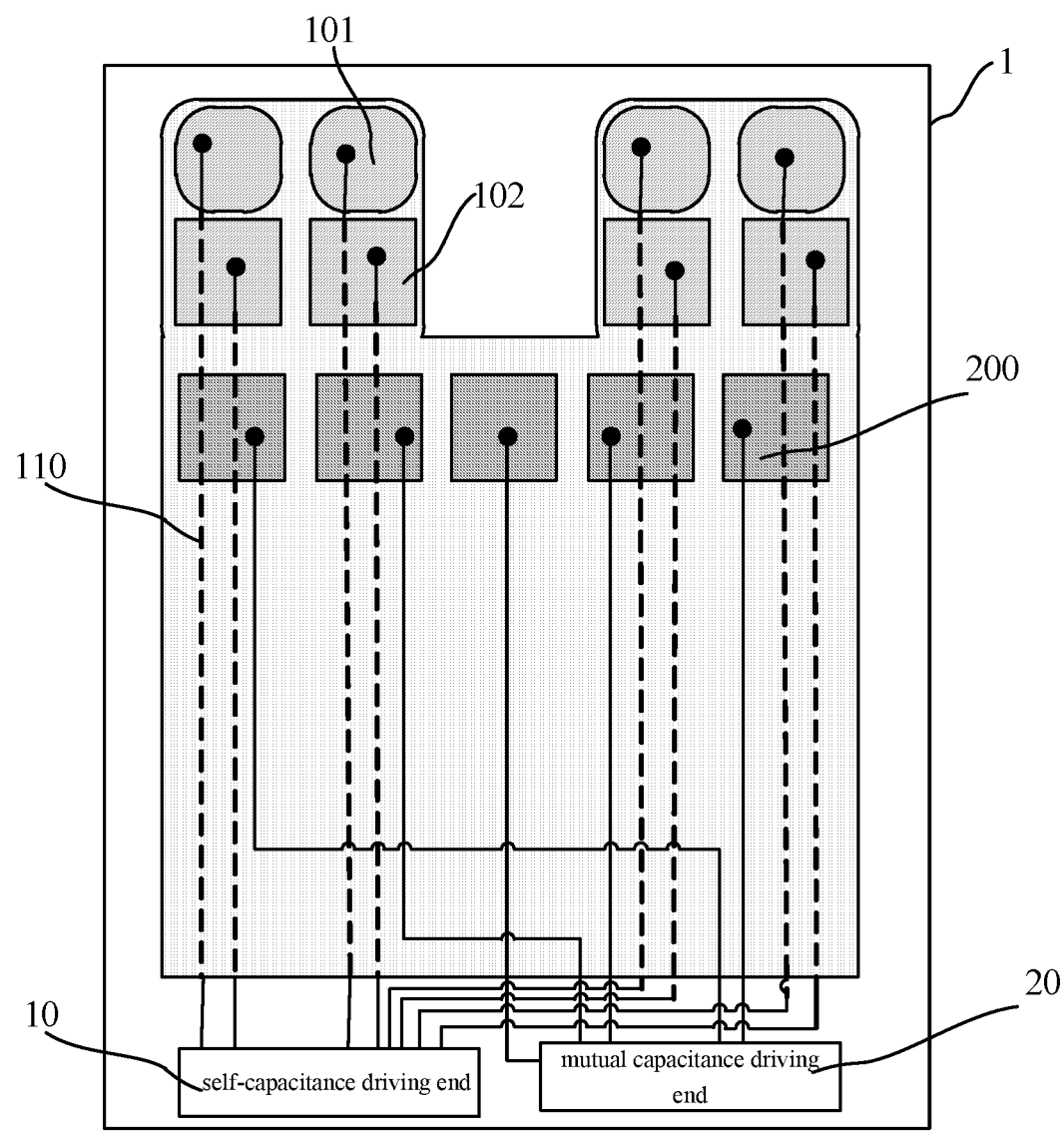
FIG. 12 is a seventh structural schematic diagram of the display panel according to an embodiment of the present disclosure.

In another implementation, as shown in FIG. 12, which is a seventh structural schematic diagram of the display panel according to an embodiment of the present disclosure, the display panel 1 further includes a self-capacitance driving end 10 and a mutual capacitance driving end 20, the self-capacitance driving end 10 provides an electric signal for the first touch electrode 100, and the mutual capacitance driving end 20 provides an electric signal for the second touch electrode 200. In this case, the first touch electrode (self-capacitance touch electrode) in the first area has an individual self-capacitance driving end, and the second touch electrode (mutual capacitance touch electrode) in the second area has an individual mutual capacitance driving end, therefore, the first touch electrode and the second touch electrode can be driven simultaneously, so that a touch time is shortened, no mutual interference exists between the first touch electrode and the second touch electrode, and the touch accuracy is relatively high.

The display panel 1 further includes a plurality of first lead wires 110 corresponding to the plurality of first touch electrodes 100 in one-to-one correspondence, and an end of the first lead wire 110 unconnected with the first touch electrode 100 is connected with the self-capacitance driving end 10.

In order to more clearly understand the technical solutions of the present disclosure, take the liquid crystal display panel as an example, to briefly illustrate the touch principle of the first touch electrode, a self-capacitive touch electrode:

As shown in FIGS. 10 and 12, the self-capacitance driving end 10 provides an electric signal to the first touch electrode 100 (101 and 102) through a first lead wire 110, and then a sense electric signal returns to the self-capacitance driving end 10 through the first lead wire 110. When a finger touches the display panel 1, because of a coupling capacitance formed between the finger and the first touch electrode 100, the sense electric signal of the first touch electrode 100 at the position the finger touches will change, thereby detecting a touch position of the finger.

It should be noted that, the sense electric signal can be a voltage, a current or a charge, which is not limited in the present disclosure.

Figure 13:
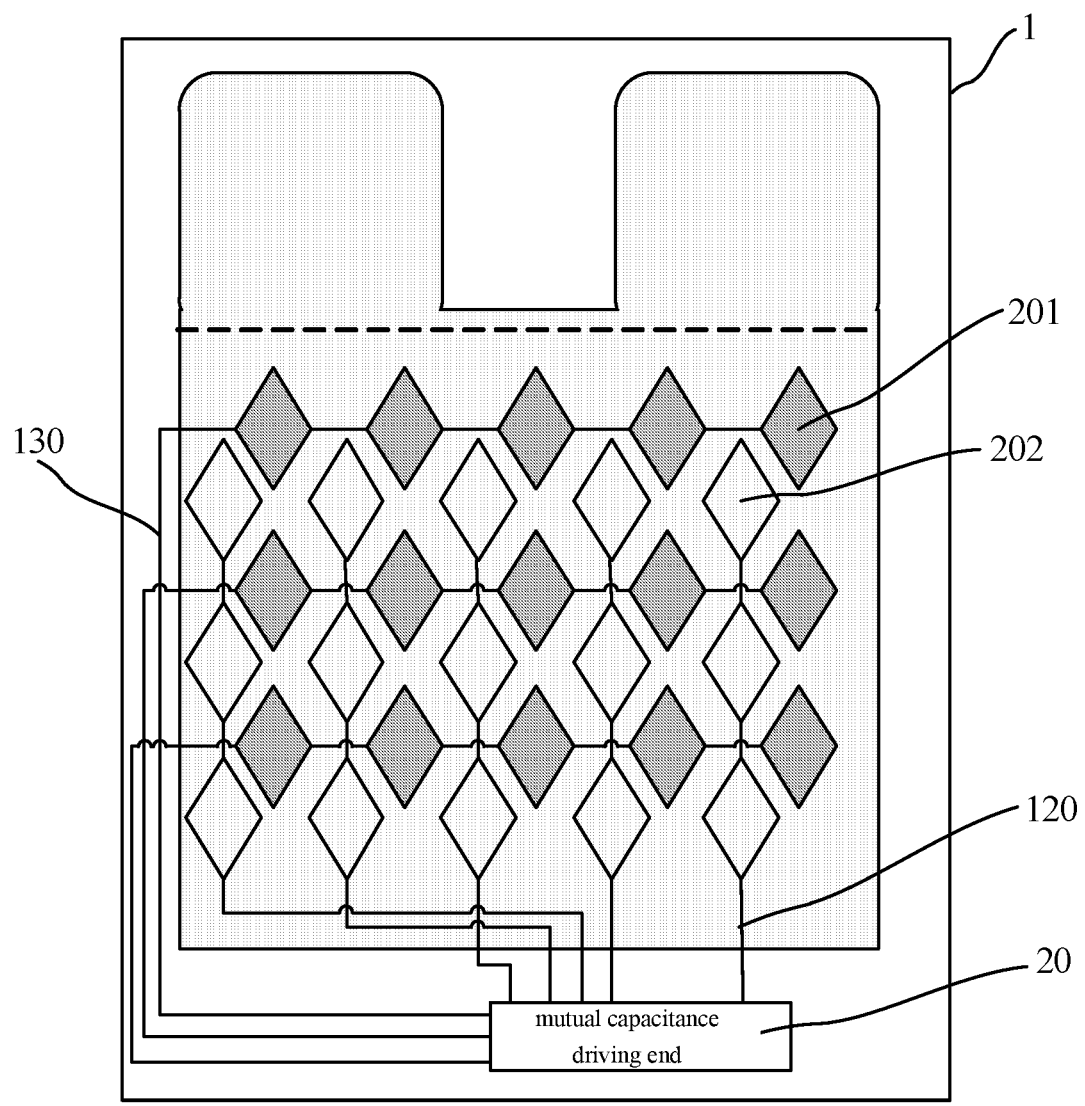
FIG. 13 is an eighth structural schematic diagram of the display panel according to an embodiment of the present disclosure.

In another feasible implementation, as shown in FIG. 13, which is an eighth structural schematic diagram of the display panel according to an embodiment of the present disclosure, the second touch electrode 200 includes a plurality of driving electrodes 201 and a plurality of sensing electrodes 202. The driving electrodes 201 and the sensing electrodes 202 are arranged in an array, and the driving electrical electrodes 201 and the sensing electrodes 202 are alternately arranged in a row direction of the array. The display panel 1 further includes a plurality of second lead wires 120 and a plurality of third lead wires 130. The sensing electrodes 202 in a same column are connected to the mutual capacitance driving end 20 by one second lead wire 120, and the driving electrodes 201 in a same row are connected to the mutual capacitance drive end 20 by one third lead wire 130.

The driving electrodes 201 and the sensing electrodes 202 are arranged in a same layer, which can reduce the making procedure, improve the making efficiency of the display panel, and save the production cost.

It should be noted that, when the display panel is a liquid crystal display panel, the driving electrodes and the sensing electrodes can be arranged on the color film substrate.

When the display panel is an organic light-emitting display panel, the driving electrodes and the sensing electrodes can be arranged on the cover plate. When the display panel is a flexible display panel, the driving electrodes and the sensing electrodes can be arranged in the packaging layer.

Taking the liquid crystal display panel as an example, the working principle of the mutual capacitive touch electrode is illustrated as follows:

As shown in FIGS. 10 and 13, when the finger touches the display panel, the driving electrodes 201 and the induction electrodes 202 form a coupling capacitor, and the sensing electrodes 202 transmits the sense electric signals sensed to the mutual capacitance driving end 20, so as to determine the touch position of the finger.

In another feasible technical solution, the first touch electrode and the second touch electrode are made of indium zinc oxide or metal grid. It should be interpreted that, when the display panel is a flexible display panel, the first touch electrode and the second touch electrode are preferably made of the metal grid, because the metal grid has a good bending performance, which can meet the bending needs of the flexible display panel.

Figure 14:
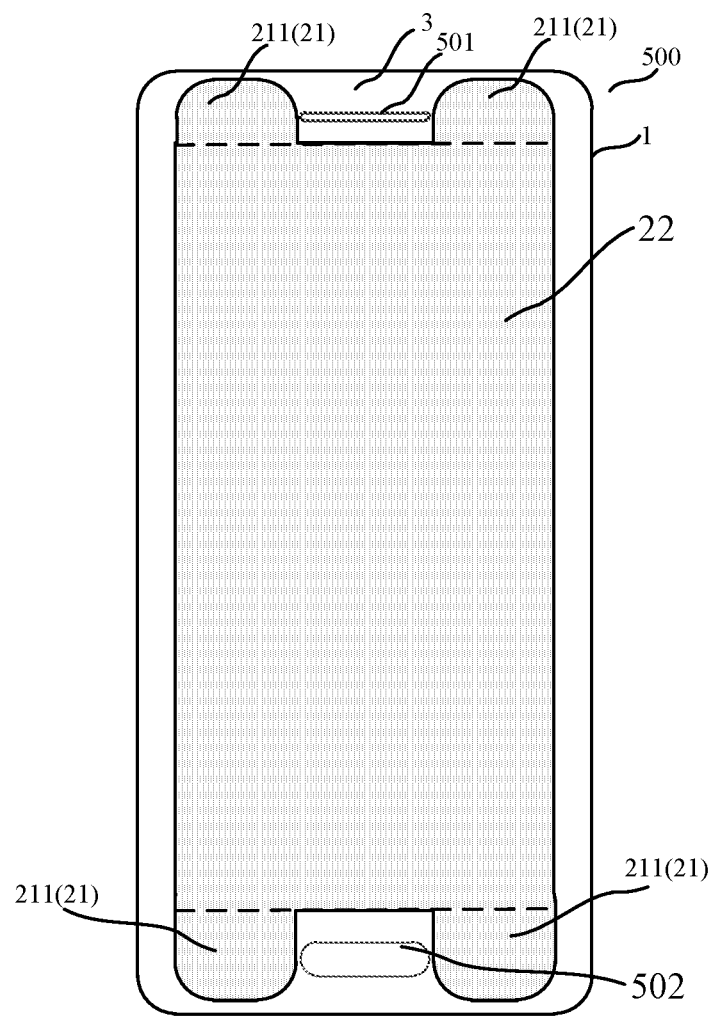
FIG. 14 is a structural schematic diagram of a mobile terminal according to an embodiment of the present disclosure.

The present disclosure provides a mobile terminal. As shown in FIG. 14, which is a structural schematic diagram of the mobile terminal according to an embodiment of the present disclosure, the mobile terminal 500 includes a display panel 1 according to any embodiment above. It should be noted that the mobile terminal is illustrated with a cell phone as an example in FIG. 14, but the mobile terminal is not limited to the cell phone. The mobile terminal may include but not limited to personal computer (PC), personal digital assistant (PDA), wireless handheld devices, tablet computer, MP4 player, TV, or any other electronic device with display function.

In the mobile terminal, the first area is a convex area extending from a side of the second area and protruding away from the side of the second area, and can be called as a special-shaped area. The first touch electrode is placed in the first area so as to achieve the touch of this first area. In addition, the first touch electrode can be a self-capacitance touch electrode with relatively high freedom degree and diverse shapes, which can meet the touch needs of users when arranged in the first area. Moreover, the first area as display area can meet a pursuit of the users for a narrow border.

Further, as shown in FIG. 14, the display panel includes a first area 21, the first area 21 includes at least two subareas 211, and the two sub areas 211 are spaced from one another, for example, spaced by a non-display area 3.

The mobile terminal further includes a receiver 501, a camera (not shown in the figure) and a control key 502. The receiver 501 is placed in the non-display area 3 located between two subareas 211. The camera is also placed in the non-display area 3 between the two sub areas 211. The control key 502 is placed in the non-display area 3 between another two sub areas 211.

Figure 15:
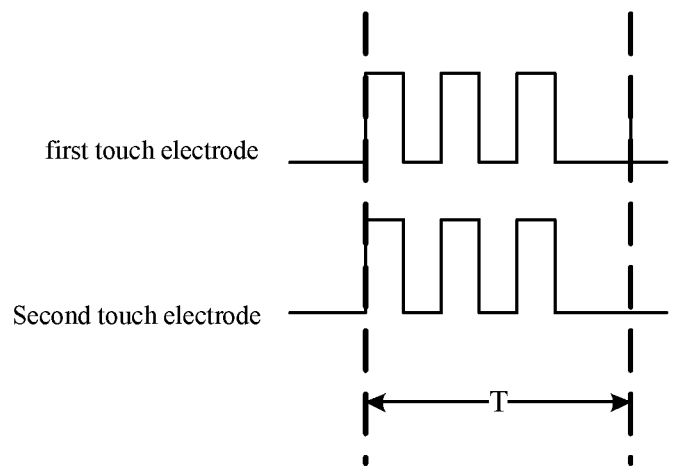
FIG. 15 is a first sequence diagram of a driving method according to an embodiment of the present disclosure.

The embodiments of the present disclosure provide a driving method. As shown in FIG. 15, which is a first sequence diagram of the driving method according to an embodiment of the present disclosure, the driving method is suitable for the mobile terminal in the embodiments of the present disclosure. In a touch stage T, the driving method includes steps of: providing a driving electric signal to each first touch electrode and providing a driving electric signal to each second touch electrode simultaneously, acquiring a sense electric signal of each first touch electrode, and acquiring another sense electric signal of each second touch electrode.

In the touch stage, the touch position is determined according to the acquired sense electric signals.

In the touch stage, driving the first touch electrode and the second touch simultaneously can effectively reduce the touch time.

Figure 16:
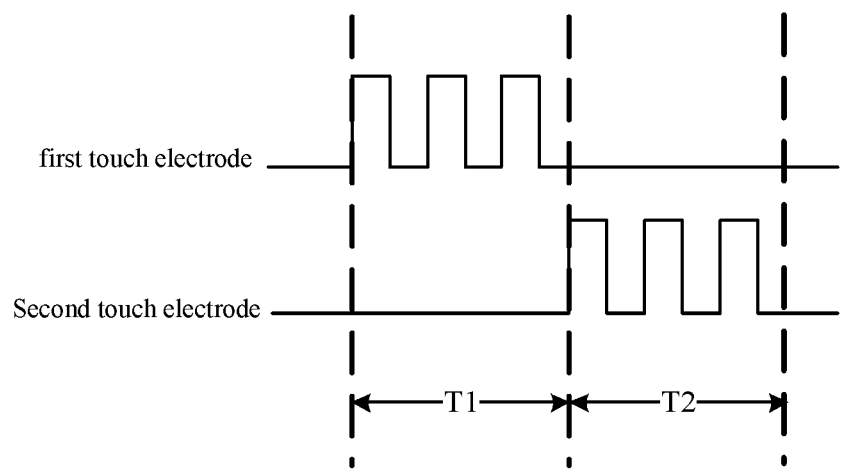
FIG. 16 is a second sequence diagram of the driving method according to an embodiment of the present disclosure.

It is understandable that, in order to simplify the circuit in IC driving end and save the cost of IC, the first touch electrode and the second touch electrode can be driven in a time-division manner, i.e., as shown in FIG. 16, which is a second sequence diagram of the driving method according to an embodiment of the present disclosure, in the touch stage, the method further includes steps of: providing a driving electric signal to each of the first touch electrodes and acquiring a sense electric signal of each of the first touch electrodes at moment T1; providing a driving electric signal to each of the second touch electrodes and acquiring a sense electric signal of each of the second touch electrodes at moment T2; and determining a touch position according to the sense electric signals acquired at moment T1 and the sense electric signals acquired at moment T2.

It is should be interpreted that, as the second touch electrode is a mutual capacitance touch electrode, and the mutual capacitance touch electrode includes a driving electrode and an sensing electrode, said acquiring a sense electric signal of each second touch electrode refers to acquiring a sense electric signal of the sensing electrode of each second touch electrode.

It should be noted that the terminal in the embodiments of the present disclosure includes but not limited to personal computer (PC), personal digital assistant (PDA), wireless handheld devices, tablet computer, MP3 player, MP4 player, etc.

Those skilled in the art should clearly understand that, for description convenience and conciseness, the specific working processes of the system, device and unit described above can refer to the corresponding process in the above method, which are not repeated herein.

The above is merely preferred embodiments of the present disclosure, but not to limit the present disclosure. Any modification, equivalent substitution or improvement made within the principles of the present disclosure should be included in the protection scope of the present disclosure.

It should be finally noted that the above embodiments are merely used to illustrate the technical solutions of the present disclosure, rather than to limit the present disclosure. Though the embodiments of the present disclosure are described in detail as above, those skilled in the art can also make modifications to the technical solutions recorded in the embodiments, or make equivalent substitution to part or all of the technical solutions, without departing from the protection scope of the embodiments of the present disclosure.

What is claimed is:

1. A display panel divided into a display area and a non-display area, wherein the display area comprises a first area and a second area, the first area being a convex area extending from a side of the second area and protruding away from the side of the second area;
wherein the display panel comprises:
a plurality of first touch electrodes placed in the first area, and
plurality of second touch electrodes placed in the second area,
wherein each of the plurality of first touch electrodes is a self-capacitance touch electrode, and each of the plurality of second touch electrodes is a mutual capacitance touch electrode,
wherein the first area comprises at least two subareas, the at least two subareas are located at a same side of the second area, and the at least two subareas are spaced from one another,
wherein the plurality of first touch electrodes comprises a plurality of first touch sub-electrodes and a plurality of second touch sub-electrodes, at least one first touch sub-electrode and at least one second touch sub-electrode are placed in each of the at least two subareas,
wherein the plurality of second touch sub-electrodes are aligned in a row direction and a column direction, and the plurality of first touch sub-electrodes are not aligned in the row direction and the column direction; and
wherein an area ratio of each of the first touch sub-electrodes to each of the second touch sub-electrodes is defined as x, where 0.9≤x<1;
wherein the display panel further comprises:
a self-capacitance driving end providing an electric signal for each of the plurality of self-capacitance touch electrodes; and
a plurality of first lead wires connected with the plurality of first touch sub-electrodes and the plurality of second touch sub-electrodes in one-to-one correspondence, and each of the plurality of first touch sub-electrode and each of the plurality of second touch sub-electrode is connected with a different one of the plurality of first lead wires, wherein ends of the plurality of first lead wires unconnected with the plurality of self-capacitance touch electrodes are connected with the self-capacitance driving end,
wherein the plurality of self-capacitance touch electrodes are arranged in an array in the first area without any mutual capacitance touch electrode interposed therebetween.

2. The display panel according to claim 1, wherein the second area is shaped like a rectangle or like a rectangle with a round corner.

3. The display panel according to claim 1, wherein each of the at least two subareas is shaped like a rectangle.

4. The display panel according to claim 1, wherein each of the at least two subareas comprises a first edge, a connection edge, and a second edge, and the first edge is connected with the second edge by the connection edge; and an extending direction of the first edge is perpendicular or substantially perpendicular to an extending direction of the second edge.

5. The display panel according to claim 4, wherein one or more of the at least one first touch sub-electrode are adjacent to the connection edge;
the one or more first touch sub-electrodes adjacent to the connection edge has one or more edges adjacent to the connection edge, and the one or more edges adjacent to the connection edge when spliced together have a same shape as the connection edge.

6. The display panel according to claim 5, wherein the connection edge is an arc line, a straight line, or a polygonal line.

7. The display panel according to claim 1, wherein the at least two subareas are identical in shape and area.

8. The display panel according to the claim 1, wherein the plurality of first touch electrodes and the plurality of second touch electrodes are arranged in a same layer.

9. The display panel according to the claim 1, further comprising the mutual capacitance driving end provides an electric signal for each of the plurality of second touch electrodes.

10. The display panel according to claim 9, further comprising:
a plurality of second lead wires, and
a plurality of third lead wires;
wherein each of the mutual capacitance touch electrodes comprises a driving electrode and a sensing electrode, the driving electrodes and the sensing electrodes are arranged in an array, and the driving electrodes and the sensing electrodes are alternately arranged in a row direction of the array;
wherein the sensing electrodes in a same column are connected to the mutual capacitance driving end by one of the plurality of second lead wires, and the driving electrodes in a same row are connected to the mutual capacitance driving end by one of the plurality of third lead wires; and
wherein the driving electrodes and the sensing electrodes are arranged in a same layer.

11. The display panel according to claim 1, wherein each of the plurality of first touch electrodes and each of the plurality of second touch electrodes are made of indium zinc oxide or metal grid.

12. The display panel according to claim 1, wherein the display panel is a liquid crystal display panel, the liquid crystal display panel comprises an array substrate, a color film substrate corresponding to the array substrate, and a liquid crystal layer located between the array substrate and the color film substrate;
wherein the plurality of first touch electrodes and the plurality of second touch electrodes are all arranged on the color film substrate.

13. The display panel according to claim 1, wherein the display panel is an organic light-emitting display panel.

14. The display panel according to claim 1, wherein each of touch electrodes that are arranged adjacent to an edge of the first area is a self-capacitance touch electrode.

15. A mobile terminal, comprising a display panel divided into a display area and a non-display area, wherein the display area comprises a first area and a second area, the first area being a convex area extending from a side of the second area and protruding away from the side of the second area;
wherein the display panel comprises:
a plurality of first touch electrodes placed in the first area, and
a plurality of second touch electrodes placed in the second area,
wherein each of the plurality of first touch electrodes is a self-capacitance touch electrode, and each of the plurality of second touch electrodes is a mutual capacitance touch electrode,
wherein the first area comprises at least two subareas, the at least two subareas are located at a same side of the second area, and the at least two subareas are spaced from one another,
wherein the plurality of first touch electrodes comprises a plurality of first touch sub-electrodes and a plurality of second touch sub-electrodes, at least one first touch sub-electrode and at least one second touch sub-electrode are placed in each of the at least two subareas,
wherein the plurality of second touch sub-electrodes are aligned in a row direction and a column direction, and the plurality of first touch sub-electrodes are not aligned in the row direction and the column direction; and
wherein an area ratio of each of the first touch sub-electrodes to each of the second touch sub-electrodes is defined as x, where $0.9 \leq x < 1$;
wherein the display panel further comprises:
a self-capacitance driving end providing an electric signal for each of the plurality of self-capacitance touch electrodes; and
a plurality of first lead wires connected with the plurality of first touch sub-electrodes and the plurality of second touch sub-electrodes in one-to-one correspondence, and each of the plurality of first touch sub-electrode and each of the plurality of second touch sub-electrode is connected with a different one of the plurality of first lead wires, wherein ends of the plurality of first lead wires unconnected with the plurality of self-capacitance touch electrodes are connected with the self-capacitance driving end,
wherein the plurality of self-capacitance touch electrodes are arranged in an array in the first area without any mutual capacitance touch electrode interposed therebetween.

16. The mobile terminal according to claim 15, further comprising:
a receiver, and
a control key;
wherein the display panel comprises a first area, the first area comprises at least two subareas, and the at least two subareas are spaced from one another; and
wherein the receiver is arranged in the non-display area between two of the at least two subareas; and the control key is arranged in the non-display area between another two of the at least two subareas.

17. The mobile terminal according to claim 16, wherein each of the at least two subareas comprises a first edge, a connection edge, and a second edge, and the first edge is connected with the second edge by the connection edge; and an extending direction of the first edge is perpendicular or substantially perpendicular to an extending direction of the second edge;
one or more of the at least one first touch sub-electrode are adjacent to the connection edge; the one or more first touch sub-electrodes adjacent to the connection edge has one or more edges adjacent to the connection edge, and the one or more edges adjacent to the connection edge when spliced together have a same shape as the connection edge.

18. A driving method applicable for a mobile terminal, in a touch stage, comprising:
providing a driving electric signal to each of a plurality of self-capacitance touch electrodes and providing a driving electric signal to each of a plurality of mutual capacitance touch electrodes simultaneously,
acquiring a sense electric signal of each of the plurality of self-capacitance touch electrodes, and
acquiring another sense electric signal of each of the plurality of mutual capacitance touch electrodes,
wherein the mobile terminal comprises a display panel divided into a display area and a non-display area, wherein the display area comprises a first area and a second area, the first area being a convex area extending from a side of the second area and protruding away from the side of the second area;

wherein the plurality of self-capacitance touch electrodes and the plurality of mutual capacitance touch electrodes are parts of the display panel; and wherein the plurality of self-capacitance touch electrodes is placed in the first area, and the plurality of mutual capacitance touch electrodes is placed in the second area, wherein the first area comprises at least two subareas, the at least two subareas are located at a same side of the second area, and the at least two subareas are spaced from one another, wherein the plurality of self-capacitance touch electrodes comprises a plurality of first self-capacitance touch sub-electrodes and a plurality of second self-capacitance touch sub-electrodes, and at least one first self-capacitance touch sub-electrode and at least one second self-capacitance touch sub-electrode are placed in each of the at least two subareas, wherein the plurality of second touch sub-electrodes are aligned in a row direction and a column direction, and the plurality of first touch sub-electrodes are not aligned in the row direction and the column direction; and wherein an area ratio of each of the first self-capacitance touch sub-electrodes to each of the second self-capacitance touch sub-electrodes is defined as x, where $0.9x<1$;

wherein the display panel further comprises:

a self-capacitance driving end providing an electric signal for each of the plurality of self-capacitance touch electrodes; and a plurality of first lead wires connected with the plurality of first touch sub-electrodes and the plurality of second touch sub-electrodes in one-to-one correspondence, and each of the plurality of first touch sub-electrode and each of the plurality of second touch sub-electrode is connected with a different one of the plurality of first lead wires, wherein ends of the plurality of first lead wires unconnected with the plurality of self-capacitance touch electrodes are connected with the self-capacitance driving end, wherein the plurality of self-capacitance touch electrodes are arranged in an array in the first area without any mutual capacitance touch electrode interposed therebetween.

* * * * *